(12) United States Patent
Jiang

(10) Patent No.: US 12,186,655 B2
(45) Date of Patent: Jan. 7, 2025

(54) FORCE FEEDBACK MODULE, GAMEPAD AND GAME SYSTEM

(71) Applicant: GOERTEK INC., Shandong (CN)

(72) Inventor: Guangcun Jiang, Shandong (CN)

(73) Assignee: GOERTEK INC., Shandong (CN)

( * ) Notice: Subject to any disclaimer, the term of this patent is extended or adjusted under 35 U.S.C. 154(b) by 0 days.

(21) Appl. No.: 17/929,014

(22) PCT Filed: Jun. 24, 2021

(86) PCT No.: PCT/CN2021/101996
§ 371 (c)(1),
(2) Date: Aug. 10, 2022

(87) PCT Pub. No.: WO2022/217747
PCT Pub. Date: Oct. 20, 2022

(65) Prior Publication Data
US 2024/0189706 A1    Jun. 13, 2024

(30) Foreign Application Priority Data

Apr. 16, 2021 (CN) .......................... 202110414368.2

(51) Int. Cl.
*A63F 13/285* (2014.01)
*A63F 13/24* (2014.01)

(52) U.S. Cl.
CPC ............ *A63F 13/285* (2014.09); *A63F 13/24* (2014.09)

(58) Field of Classification Search
CPC .............................. A63F 13/285; A63F 13/24
See application file for complete search history.

(56) References Cited

U.S. PATENT DOCUMENTS

| 2011/0177749 | A1* | 7/2011 | Zuloff ................... A63F 9/0079 446/473 |
| 2014/0094310 | A1* | 4/2014 | Bleich ................. G07F 17/3209 463/38 |
| 2018/0018020 | A1* | 1/2018 | Grant ..................... G06F 3/0338 |
| 2018/0345133 | A1* | 12/2018 | Gassoway ............... A63F 13/24 |
| 2020/0276499 | A1 | 9/2020 | Black et al. |
| 2021/0394047 | A1* | 12/2021 | Orion ...................... A63F 13/24 |

FOREIGN PATENT DOCUMENTS

| CN | 104107539 A | 10/2014 |
| CN | 110709144 A | 1/2020 |
| CN | 111330261 A | 6/2020 |
| CN | 111346368 A | 6/2020 |
| CN | 111359202 A | 7/2020 |
| CN | 111566601 A | 8/2020 |
| CN | 212038968 U | 12/2020 |
| JP | 2004033371 A | 2/2004 |

* cited by examiner

*Primary Examiner* — Peter J Iannuzzi
(74) *Attorney, Agent, or Firm* — LKGlobal | Lorenz & Kopf, LLP

(57) ABSTRACT

A force feedback module, a gamepad and a game system are provided. The force feedback module of a gamepad comprises: a drive mechanism for generating a feedback force; a gamepad trigger; a unidirectional transmission mechanism that is coupled between the drive mechanism and the gamepad trigger and transmits the feedback force from the drive mechanism to the gamepad trigger in one direction.

8 Claims, 5 Drawing Sheets

FORCE FEEDBACK MODULE, GAMEPAD AND GAME SYSTEM

CROSS-REFERENCE TO RELATED APPLICATION

This Application is a U.S. National-Stage entry under 35 U.S.C. § 371 based on International Application No. PCT/CN2021/101996, filed Jun. 24, 2021, which was published under PCT Article 21(2) and which claims priority to Chinese Application No. 202110414368.2 filed Apr. 16, 2021, which are all hereby incorporated herein in their entirety by reference.

TECHNICAL FIELD

This application pertains to the technical field of gamepads, more specifically, to a force feedback module of a gamepad, a gamepad and a game system.

BACKGROUND

The gamepad is a common tool for game users to participate in games. Users can use the gamepad to control objects in the game, input information, etc.

However, due to the limited space in the gamepad, it is difficult to add mechanical devices in the gamepad to convey the feelings in the real scene to the user. Currently the simple vibration device in the gamepad is far from meeting the needs of game users for game experience. In addition, other objects, desirable features and characteristics will become apparent from the subsequent summary and detailed description, and the appended claims, taken in conjunction with the accompanying drawings and this background.

SUMMARY

The present disclosure provides a new technical solution of a force feedback module for a gamepad.

According to a first aspect of the present disclosure, there is provided a force feedback module of a gamepad, which comprises: a drive mechanism for generating a feedback force; a gamepad trigger; and a unidirectional transmission mechanism that is coupled between the drive mechanism and the gamepad trigger and transmits the feedback force from the drive mechanism to the gamepad trigger in one direction.

According to a second aspect of the present disclosure, there is provided a gamepad, which comprises: a gamepad control unit for generating a feedback force control signal; and the force feedback module according to the embodiments, wherein the drive mechanism of the force feedback module receives the feedback force control signal to generate a corresponding feedback force.

According to a third aspect of the present disclosure, there is provided a game system, which comprises: a game processing device for generating a feedback force signal required by the game; and the gamepad according to the embodiments, wherein the gamepad control unit of the gamepad receives the feedback force signal from the game processing device and generates a corresponding feedback force control signal.

Force feedback modules suitable for a gamepad can be provided in various embodiments.

Other features and advantages of the present disclosure will become apparent from the following detailed description of exemplary embodiments of the present disclosure with reference to the accompanying drawings.

BRIEF DESCRIPTION OF DRAWINGS

The present invention will hereinafter be described in conjunction with the following drawing figures, wherein like numerals denote like elements, and.

DETAILED DESCRIPTION

Figure 1:
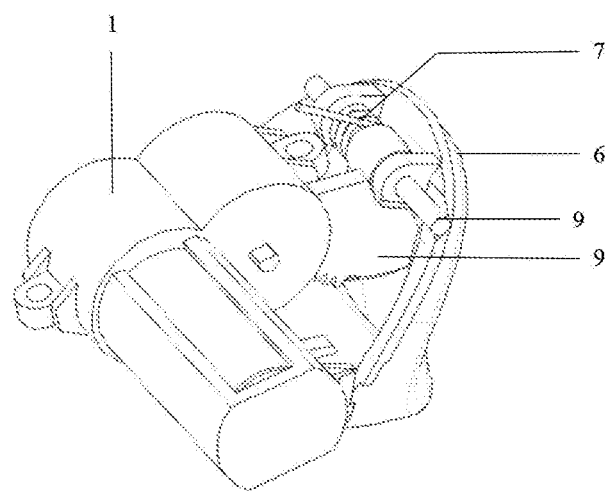
FIG. 1 is a schematic diagram of a force feedback module according to an embodiment.

The following detailed description is merely exemplary in nature and is not intended to limit the invention or the application and uses of the invention. Furthermore, there is no intention to be bound by any theory presented in the preceding background of the invention or the following detailed description.

Various exemplary embodiments will now be described in detail with reference to the accompanying drawings.

The following description of at least one exemplary embodiment is only illustrative and in no way constitutes any limitation on the implementation solutions, use and application.

It should be noted that similar reference numerals and letters indicate similar items in the following drawings. Therefore, once an item is defined in a drawing, it does not need to be further discussed in subsequent drawings.

With the development of technology, the requirements for the user experience of gamepads from the game users are constantly increasing. Therefore, different feelings need to be fed back to the game players according to different game scenes, so as to increase the realisticity of the game and enhance the interest of the game.

In view of this, it is proposed herein to add a force feedback mechanism to the gamepad, so that different functions such as pushback and vibration can be provided when the user operates.

Here, the force feedback module of the gamepad may comprise: a drive mechanism, which generates a feedback force; a gamepad trigger; and a unidirectional transmission mechanism, which is coupled between the drive mechanism and the gamepad trigger and transmits the feedback force from the drive mechanism to the gamepad trigger in one direction.

Here, the force feedback module has a simple structure and is suitable for gamepads. For gamepads, especially single handed gamepads, this simple structure can greatly save space, so that the force feedback module can be effectively applied to gamepads, especially small gamepads.

In addition, by transmitting the feedback force through the unidirectional transmission structure, it can be combined with the gamepad trigger to generate the feedback force when the drive mechanism is working, and can be separated from the gamepad trigger without affecting the movement of the gamepad trigger when the drive mechanism is working. In this way, on the one hand, the gamepad can be compatible with force feedback mode and non-force feedback mode; on the other hand, for the frequently used gamepad, the force feedback module will not make the gamepad completely unusable.

In an embodiment, the force feedback module may also comprise a reset mechanism. The reset mechanism drives the gamepad trigger to reset after the external force for pressing the gamepad trigger is released.

In the gamepad comprising the force feedback function, the reset mechanism is independent of the force feedback part and is closer to the gamepad in terms of setting. In this way, on the one hand, the force feedback part does not need to consider the issue of reset, so the design of the force feedback part can be independent from the design of the gamepad; on the other hand, for the gamepad that game users often use heavily, this design can ensure that the basic working performance of the gamepad can still be guaranteed when the force feedback part does not work or fails.

The different embodiments and examples of the force feedback module of the gamepad will be described below with reference to FIGS. 1-9.

Figure 2:
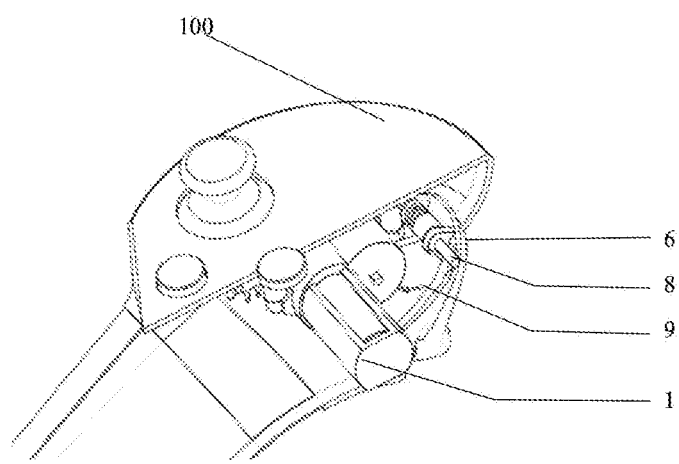
FIG. 2 is a schematic block diagram of the position of a force feedback module in a gamepad according to an embodiment.
Figure 3:
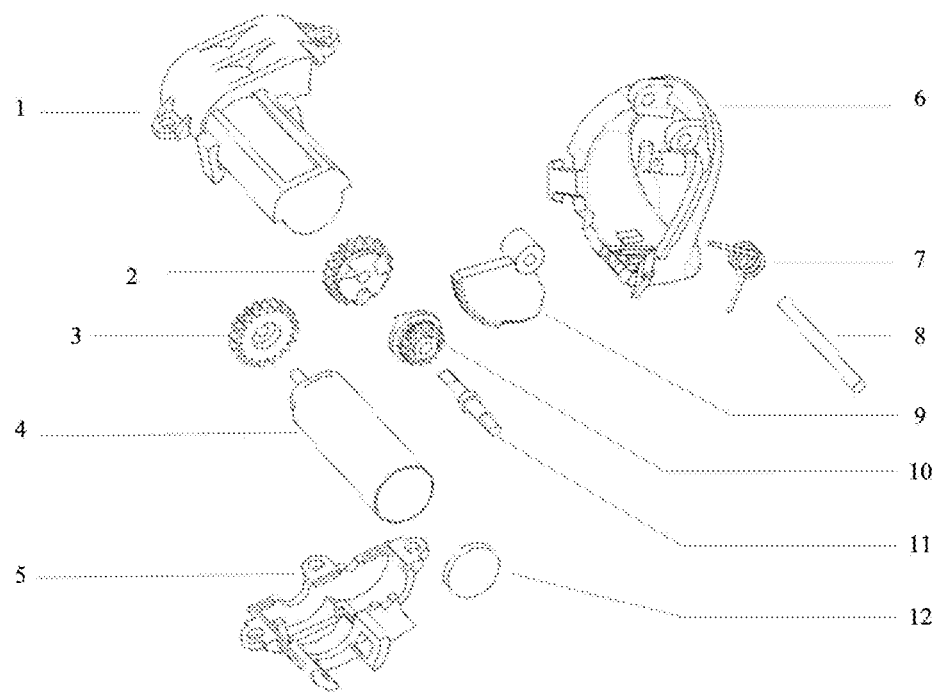
FIG. 3 is a schematic exploded view of a force feedback module according to an embodiment.

FIG. 1 is a schematic diagram of the overall structure of a force feedback module according to an embodiment, FIG. 2 is a schematic block diagram of the position of a force feedback module in a gamepad according to an embodiment, and FIG. 3 is a schematic exploded view of components of a force feedback module according to an embodiment.

In FIG. 1, an upper housing 1, a gamepad trigger 6, a torsion spring 7, a trigger shaft 8 and a trigger gear 9 of the force feedback module can be seen. The trigger gear 9 is disposed on the trigger shaft 8. The torsion spring 7 is also disposed on the trigger shaft 8.

In the exemplary embodiment of FIG. 2, the force feedback module is located in the gamepad 100, and is located below an upper button of the gamepad 100. When the game user grips the gamepad 100, the gamepad trigger at the back of the gamepad produces a force feedback effect when the user operates.

The exploded view of FIG. 3 shows the upper housing 1, a driving ratchet gear 2, a motor gear 3, a motor 4, a lower housing 5, the gamepad trigger 6, the torsion spring 7, the trigger shaft 8, the trigger gear 9, a driven ratchet gear 10, a ratchet gear shaft 11 and a silicone pad 12.

Figure 4:
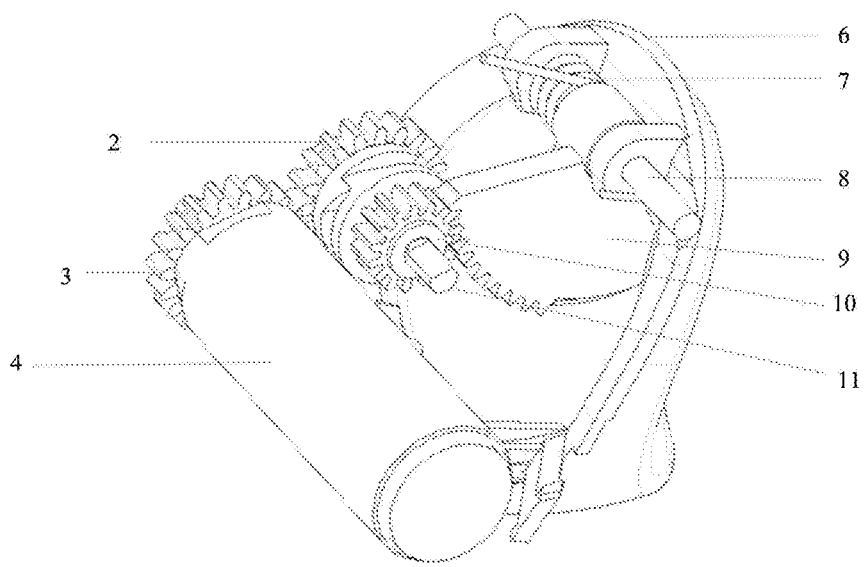
FIG. 4 is a schematic diagram of component engagement relationship in a force feedback module according to an embodiment.

FIG. 4 is a schematic diagram of component engagement relationship in a force feedback module according to an embodiment.

In this embodiment, the drive mechanism comprises a motor 4 and a motor gear 3. The motor gear 3 is fixed on the output shaft of the motor 4. Thus, when the output shaft of the motor 4 rotates, the motor gear 3 also follows to rotate. The unidirectional transmission mechanism comprises a driving ratchet gear 2 and a driven ratchet gear 10 engaged by ratchet teeth. Both the driving ratchet gear 2 and the driven ratchet gear 10 are mounted on the ratchet gear shaft 11. The ratchet gear shaft 11 may be fixed between the upper housing 1 and the lower housing 5.

As shown in FIG. 4, the motor gear 3 is meshed with the driving ratchet gear 2. The driving ratchet gear 2 can drive the driven ratchet gear 10 in the feedback force transmission direction.

Since the motor 4 is meshed with the driving ratchet gear 2 of the unidirectional transmission mechanism through the motor gear 3, the position of the motor 4 has a large degree of freedom relative to the position of the unidirectional transmission mechanism. For example, the motor 4 may also be located on the upper or lower side of the driving ratchet gear 2; alternatively, the motor 4 may also be located on a side opposite to the driven ratchet gear 10 with respect to the motor gear 3 in FIG. 4. In the embodiment of FIG. 4, the motor 4 is located on the same side as the driven ratchet gear 10 with respect to the motor gear 3 and the driving ratchet gear 2. In this way, the force feedback module has a folded structure, so that the force feedback module has a compact contour. Using such a structure in the gamepad can further improve the utilization of the internal space of gamepad.

As shown in FIG. 4, the trigger gear 9 is meshed with the driven ratchet gear 10. In this way, the feedback force can be transmitted to the gamepad trigger through the meshing between the trigger gear 9 and the driven ratchet gear 10.

In an embodiment, the trigger gear 9 is a fan-shaped gear. On the one hand, the fan-shaped trigger gear 9 can save space; on the other hand, the side end face of the fan-shaped trigger gear 9 can abut against the inner surface of the gamepad trigger 6, thereby applying a feedback force to the gamepad trigger 6.

Here, the trigger gear 9 is mounted on the trigger shaft 8. The trigger shaft 8 may be fixed to the housing structure of the gamepad.

In this embodiment, the reset mechanism comprises a torsion spring 7. The torsion spring 7 is also disposed on the trigger shaft 8. One end of the torsion spring 7 is used to press against the housing or bracket of the gamepad, and the other end is pressed against the trigger gear 9 and applies a reset driving force towards the reset position to the trigger gear 9. In this way, the torsion spring 7 can be combined with the trigger gear 9. In this case, the reset can be realized by the torsion spring 7, and the torsion spring 7 and the trigger gear 9 share some components. In addition, when the feedback force is applied and the motor 4 is not working, the torsion spring 7 can make the trigger gear 9 abut against the inner surface of the gamepad trigger 6 without being in a relaxed state, thereby not affecting the use of the gamepad. In addition, in this case, it does not need an additional fixing device to fix the trigger gear 9 to the gamepad trigger 6.

Figure 6:
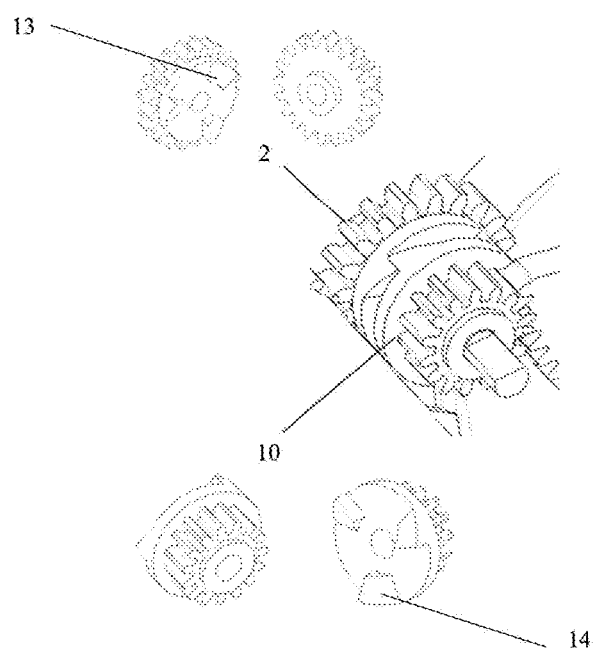
FIG. 6 is a schematic diagram of ratchet teeth engagement relationship in a force feedback module according to an embodiment.

FIG. 6 is a schematic diagram of ratchet teeth engagement relationship in a force feedback module according to an embodiment. As shown in FIG. 6, the first ratchet teeth 13 of the driving ratchet gear 2 are located on a side of the driving ratchet gear 2, the second ratchet teeth 14 of the driven ratchet gear 10 are located on a side of the driven ratchet gear 10, and the first ratchet teeth 13 and the second ratchet teeth 14 are arranged to face each other. Both the driving ratchet gear 2 and the driven ratchet gear 10 are mounted on the ratchet gear shaft 11. Such a ratchet structure is simple, easy to realize and low in manufacturing cost.

As shown in FIG. 6, the first ratchet teeth 13 comprises at least three ratchet teeth portions uniformly distributed along the circular side of the driving ratchet gear 2, and the second ratchet teeth 14 comprises at least three ratchet teeth portions uniformly distributed along the circular side of the driven ratchet gear 10. Such a uniform ratchet teeth setting can keep the ratchet gears stable when transmitting the feedback force without too much shaking and thus affecting the feedback effect.

In addition, the spacing of the ratchet teeth portions may correspond to the pressing stroke of the gamepad trigger 6. In other words, when the gamepad trigger 6 is pressed from the outermost side to the innermost side, the distance that one ratchet teeth portion of the driven ratchet gear 10 moves is less than or equal to the distance between two adjacent ratchet teeth portions. In this way, the operation of the ratchet teeth can be limited to a controllable range, which can effectively improve the stability and reliability of the gamepad in the process of use.

Figure 5:
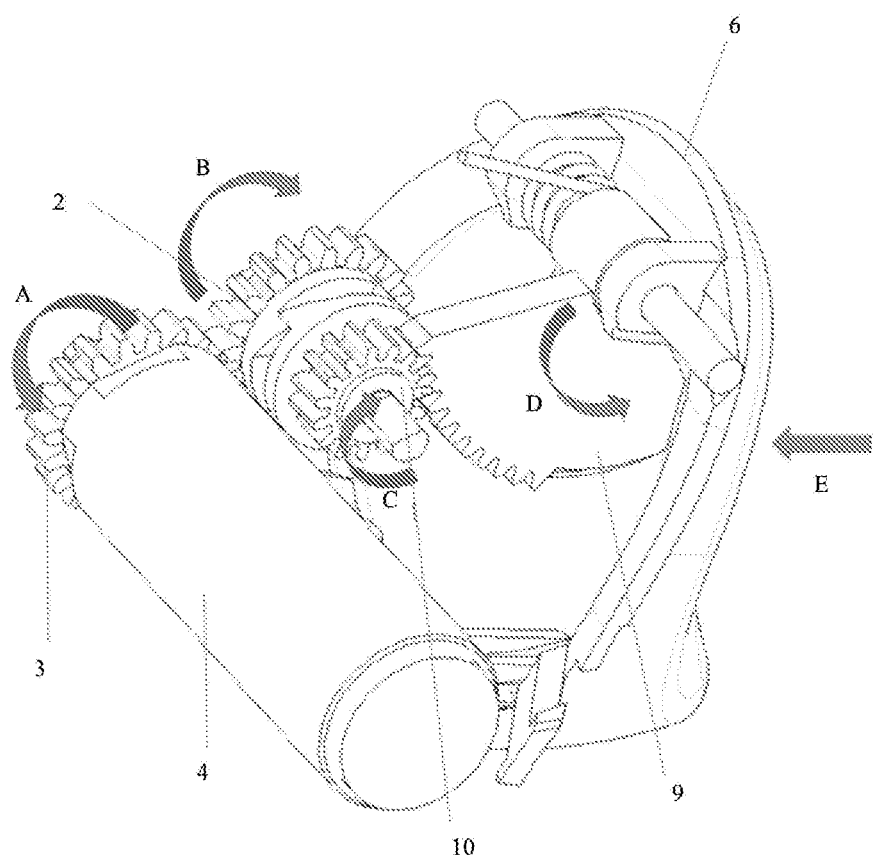
FIG. 5 is a schematic diagram of component engagement relationship in a force feedback module in operating state according to an embodiment.

FIG. 5 is a schematic diagram of component engagement relationship in the force feedback module in operating state according to an embodiment.

As shown in FIG. 5, when the motor 4 works, the output shaft drives the motor gear 3 to rotate along the direction of arrow A. The motor gear 3 drives the driving ratchet gear 2 to rotate along the direction of arrow B. At this point, the driving ratchet gear 2 drives the driven ratchet gear 10 to rotate along the direction of arrow C through ratchet teeth. Then, the driven ratchet gear 10 drives the fan-shaped trigger gear 9 to rotate along the direction of arrow D to resist the external force applied to the gamepad trigger 6 along the direction of arrow E, thereby forming a force feedback effect. The signal input to motor 4 can be adjusted according to the software to form different force feedback effects such as damping, vibration, gun trigger, etc.

Figure 7:
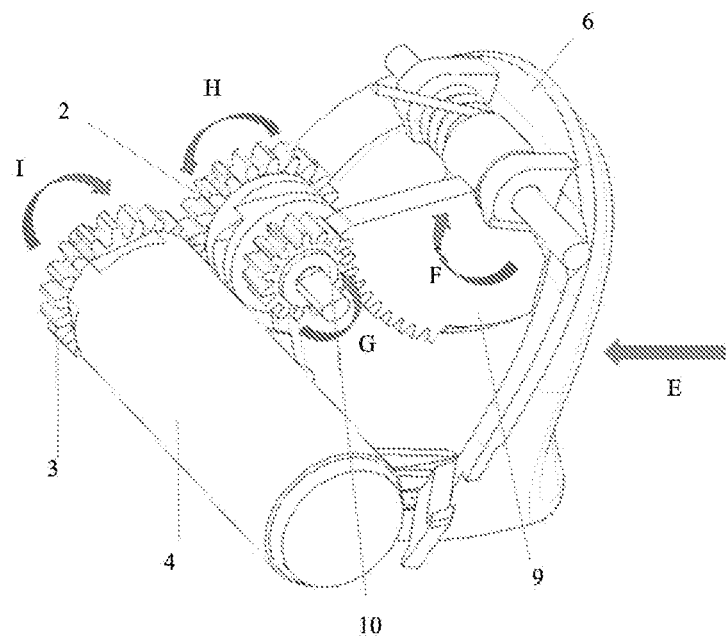
FIG. 7 is a schematic diagram of component engagement relationship in a force feedback module when a gamepad trigger is pressed according to an embodiment.

FIG. 7 is a schematic diagram of component engagement relationship in the force feedback module when the gamepad trigger is pressed according to an embodiment. When the motor 4 does not work, the working mechanism of the force feedback module when the gamepad trigger is pressed is shown in FIG. 7. As shown in FIG. 7, when the motor does not work, and the gamepad trigger 6 is pressed along the direction of arrow E for the first time, the fan-shaped trigger gear 9 is driven to move along the direction of arrow F, the driven ratchet gear 10 is driven to rotate along the direction of arrow G, and the driving ratchet gear 2 and motor gear 3 are pushed to reset through ratchet teeth.

Figure 8:
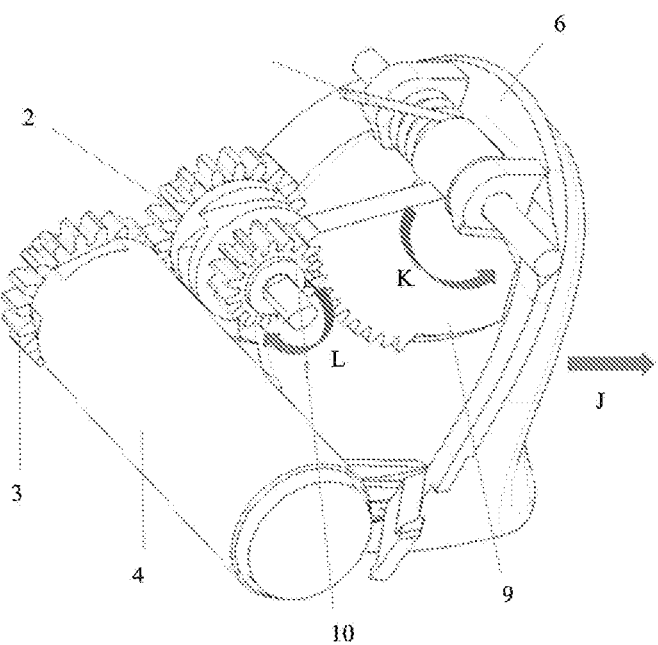
FIG. 8 is a schematic diagram of component engagement relationship in a force feedback module when the gamepad trigger is reset according to an embodiment.

FIG. 8 is a schematic diagram of component engagement relationship in a force feedback module when the gamepad trigger is reset according to an embodiment. As shown in FIG. 8, when the motor does not work, after the external force for pressing the gamepad trigger 6 is released, under the action of the torsion spring 7, the fan-shaped trigger gear 9 moves along the direction of arrow K, and the gamepad trigger 6 resets outward along the direction of arrow J. Due to the movement of the fan-shaped trigger gear 9, the driven ratchet gear 10 rotates in the direction of the arrow L. Due to the unidirectional transmission of the ratchet, the ratchet of the driven ratchet gear 10 and the driving ratchet gear 2 are separated, so that the press and reset actions of the gamepad trigger 6 is no longer affected by the motor 4, and the press and reset are realized only under the action of external force and torsion spring 7.

Figure 9:
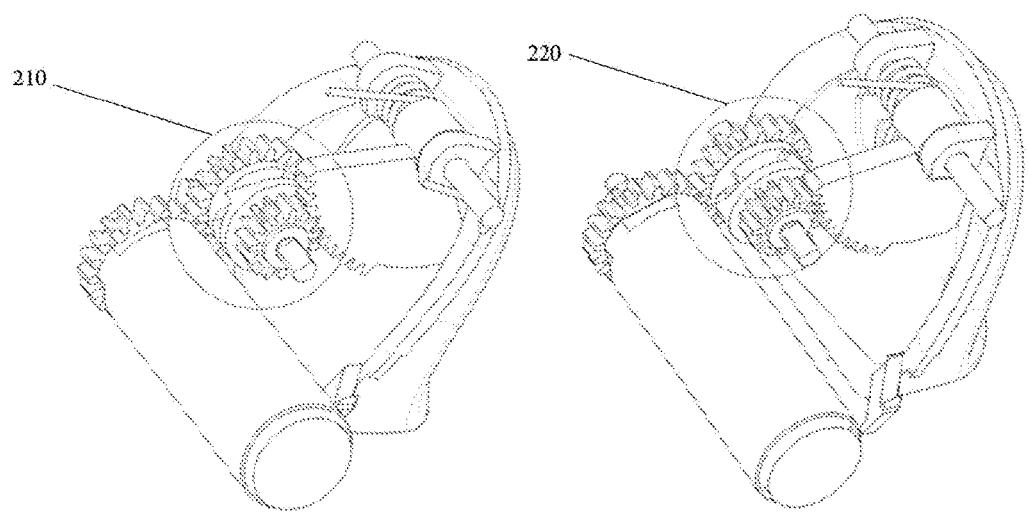
FIG. 9 is a schematic diagram of component engagement relationship in a force feedback module when the gamepad trigger is pressed and reset according to an embodiment.

FIG. 9 is a schematic diagram of component engagement relationship in a force feedback module when the gamepad trigger is pressed and reset according to an embodiment. The circle 210 in FIG. 9 indicates the state when the ratchet teeth of the driving ratchet gear 2 and the driven ratchet gear 10 are engaged. The circle 220 in FIG. 9 indicates the state when the ratchet teeth of the driving ratchet gear 2 and the driven ratchet gear 10 are disengaged.

Figure 10:
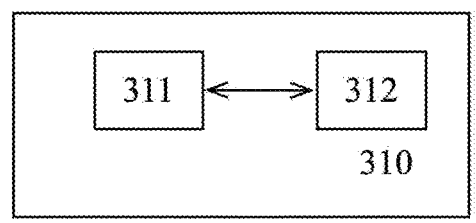
FIG. 10 is a schematic block diagram of a gamepad according to an embodiment.

FIG. 10 is a schematic block diagram of a gamepad according to an embodiment. As shown in FIG. 10, the gamepad 310 comprises a gamepad control unit 311 and a force feedback module 312. The gamepad control unit 311 generates a feedback force control signal. The force feedback module 312 is, for example, the force feedback module described in the above embodiments. The drive mechanism of the force feedback module 312 receives the feedback force control signal from the gamepad control unit 311 to generate a corresponding feedback force.

Figure 11:
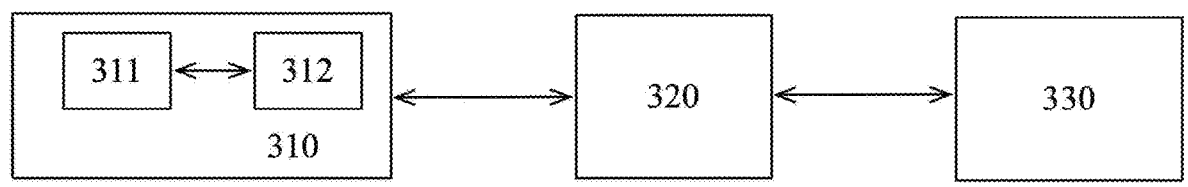
FIG. 11 is a schematic block diagram of a game system according to an embodiment.

FIG. 11 is a schematic block diagram of a game system according to an embodiment. As shown in FIG. 11, the game system comprises a gamepad 310 and a game processing device 320. In addition, the game system may also comprise a display device 330.

The gamepad 310 is, for example, the gamepad shown in FIG. 10. The game processing device 320 generates a feedback force signal required by the game. The gamepad control unit 311 of the gamepad 310 receives the feedback force signal from the game processing device 320 and generates a corresponding feedback force control signal. The gamepad control unit 311 sends the feedback force control signal to the force feedback module 312 to generate a corresponding feedback force.

The gamepad 310, the game processing device 320, and the display device 330 may be connected by various wired and/or wireless methods. The display device 330 may be, for example, a liquid crystal display device, a micro LED display device, a projection display device, etc. In some cases, at least two of the gamepad 310, the game processing device 320, and the display device 330 may be integrated together. For example, the gamepad 310, the game processing device 320, and the display device 330 may be integrated together. The game processing device 320 is provided in the gamepad 310. A micro projection display device is provided in the gamepad 310 as the display device 330.

The specific embodiments of the present disclosure have been described above. Other embodiments are within the scope of the appended claims. In some cases, the actions or steps recited in the claims may be performed in a different order from those in the embodiments and the desired results may still be achieved. In addition, the processes depicted in the drawings do not necessarily require a particular sequence or a continuous sequence as shown in order to achieve the desired results. In some embodiments, multitasking and parallel processing are also possible or may be advantageous.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. Force feedback module of a gamepad, comprising:
a drive mechanism for generating a feedback force;
a gamepad trigger; and
a unidirectional transmission mechanism that is coupled between the drive mechanism and the gamepad trigger and transmits the feedback force from the drive mechanism to the gamepad trigger in one direction,
the drive mechanism comprises a motor and a motor gear, and the motor gear is fixed on a motor output shaft,
the unidirectional transmission mechanism comprises a driving ratchet gear and a driven ratchet gear engaged by ratchet teeth, and
the motor gear is meshed with the driving ratchet gear, and the driving ratchet gear drives the driven ratchet gear in a feedback force transmission direction,
wherein first ratchet teeth of the driving ratchet gear are located on a side of the driving ratchet gear, second ratchet teeth of the driven ratchet gear are located on a side of the driven ratchet gear, and the first ratchet teeth and the second ratchet teeth are arranged to face each other.

2. The force feedback module according to claim 1 further comprising a trigger gear which meshes with the driven ratchet gear and abuts against the gamepad trigger to apply the feedback force to the gamepad trigger.

3. The force feedback module according to claim 2, further comprising a trigger shaft on which the trigger gear is mounted.

4. The force feedback module according to claim 3, further comprising a reset mechanism which drives the gamepad trigger to reset after an external force for pressing the gamepad trigger is released.

5. The force feedback module according to claim 4, wherein the reset mechanism comprises a torsion spring, the torsion spring is disposed on the trigger shaft, one end of the torsion spring is used to press against a housing or bracket of the gamepad, and the other end of the torsion spring is pressed against the trigger gear and applies a reset driving force towards a reset position to the trigger gear.

6. The force feedback module according to claim 1, wherein the first ratchet teeth comprise at least three ratchet teeth portions uniformly distributed along a circular side of the driving ratchet gear, and the second ratchet teeth comprise at least three ratchet teeth portions uniformly distributed along a circular side of the driven ratchet gear.

7. A gamepad, comprising:
a gamepad control unit for generating a feedback force control signal; and
the force feedback module according to claim 1,
wherein a drive mechanism of the force feedback module receives the feedback force control signal to generate a corresponding feedback force.

8. A game system, comprising:
a game processing device for generating a feedback force signal required by the game; and
the gamepad according to claim 7,
wherein a gamepad control unit of the gamepad receives the feedback force signal from the game processing device and generates a corresponding feedback force control signal.

* * * * *